United States Patent [19]

Yu et al.

[11] Patent Number: 4,732,259

[45] Date of Patent: Mar. 22, 1988

[54] SORTING CONVEYOR WITH CROSS-OVER

[75] Inventors: Thomas C. Yu; Robert K. Vogt, both of Cincinnati, Ohio

[73] Assignee: The E. W. Buschman Company, Cincinnati, Ohio

[21] Appl. No.: 883,893

[22] Filed: Jul. 9, 1986

[51] Int. Cl.[4] .................. B65G 47/68; B65G 47/46
[52] U.S. Cl. ............................ 198/365; 198/370; 198/372
[58] Field of Search ............ 198/365, 370, 372, 456

[56] References Cited

U.S. PATENT DOCUMENTS 3,361,247  1/1968  Lauzon et al. ............... 198/370 X

FOREIGN PATENT DOCUMENTS 2745298  11/1978  Fed. Rep. of Germany ...... 198/372

Primary Examiner—James A. Leppink
Assistant Examiner—Hoang C. Dang
Attorney, Agent, or Firm—Biebel, French & Nauman

[57] ABSTRACT

A continuous apron type sortation conveyor having carton pushers which travel with and crosswise of the apron is provided with branch lines arranged in pairs directly opposite each other along the main line to which oppositely angled guide tracks for the pushers lead from positions adjacent the center of the conveyor. The successive carton pushers enter the upstream end of the conveyor on the opposite side of the apron from the side to which they will deliver the carton assigned thereto, and immediately thereafter, they are caused to travel approximately half-way across the apron to a centered position thereon, while at the same time pushing the carton assigned thereto to a position close to the side edge of the apron from which they are to be delivered to a branch line.

6 Claims, 8 Drawing Figures

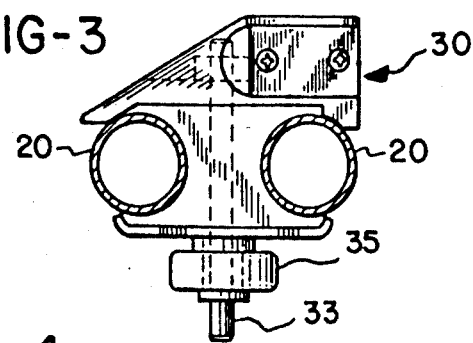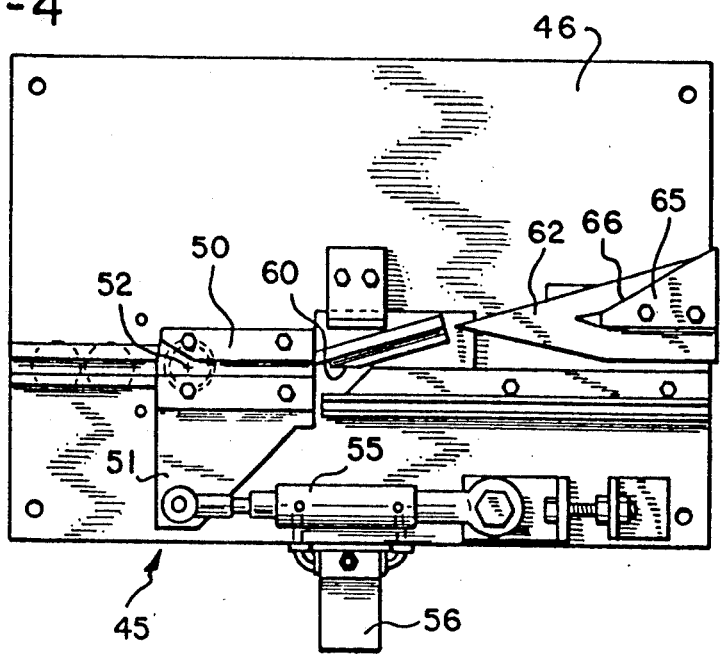

SORTING CONVEYOR WITH CROSS-OVER

BACKGROUND OF THE INVENTION

This invention relates to carton conveyors and more particularly to apron-type sortation conveyors provided with branch lines to which selected cartons can be diverted out of the main line. The present invention provides an addition to or an improvement on the sortation conveyors disclosed in the commonly owned applications of Thomas C. Yu et al, Ser. No. 675,156, filed Nov. 27, 1984, (hereinafter referred to as "Case A") and Ser. No. 857,915, filed Apr. 30, 1986 (hereinafter referred to as "Case B").

The invention is particularly concerned with such conveyors wherein the branch lines are arranged in directly opposed pairs along the main conveyor line, and the primaray object of the invention is to provide such a conveyor wherein such pairs of branch lines can be spaced as closely as possible to each other along the main line.

The sortation conveyor disclosed in Case A includes a frame defining the main line of the conveyor and at least one branch outlet therefrom, an endless apron supported for movement on the frame to define the top conveying run and a bottom return run, a plurality of pusher elements mounted for movement with the apron and also for sliding movement across the apron from one side thereof to the other, and selectively operable means for causing a desired number of pusher elements to move across the apron as they move forward with it and thereby to push the selected carton from the apron onto the selected branch conveyor.

More specifically, each of the pusher elements is equipped with a guide pin which depends therefrom, and when the pusher elements are in their normal rest positions along one side of the conveyor apron, each of these pins will pass in succession through a channeled switch member pivoted to swing between a retracted position parallel with the course of the apron and an advanced position at an acute angle to the apron course wherein it cooperates with the guide pins on successive pusher elements to divert those elements away from the side of the apron.

As soon as each diverter pin leaves the switch member, it is caused to engage a guide track which extends across the frame at an angle to the apron course. The forward movement of the pusher element with the apron will also cause it to be cammed by the guide track laterally across the apron and thereby to cooperate with successive similarly cammed pusher elements to push the selected carton onto the branch conveyor. Provision is made for returning each diverted pusher elements back to a rest position during its travel on the bottom return run of the apron back to the upstream end of the main conveyor line.

The operation of the conveyor disclosed in Case A requires that the guide pin on each diverted pusher element be continuously guided across the width of the apron until it completes its carton-ejecting movement. This is accomplished in that application by guiding the guide pin by means of a guide track extending at an angle across the entire width of the conveyor. That arrangement, however, requires that if it is decided to have branch outlets on both sides of the main conveyor, they cannot be located opposite each other but must be spaced alternately on the two sides of the main conveyor.

The conveyor disclosed in Case B includes all of the major components of the conveyor disclosed in Case A, and it also includes certain modifications and new components which make it possible to accommodate branch conveyors arranged in directly opposed pairs along the main conveyor line. More specifically, in the conveyor disclosed in Case B, provision was made for guiding a carton from the main conveyor line onto either of two directly opposed branch conveyors. This in turn required that provision be made for causing selected pusher elements to move from either side of the top apron run to the other side, depending upon the side of the main conveyor to which a particular carton is to be delivered.

In the conveyor disclosed in Case B, that objective is accomplished by the provision of a selective cross-over switching assembly which includes a pair of oppositely angled track elements positioned between the branch lines of an opposed pair in cross-defining relation. Each of these track elements, however, is in two parts which are spaced longitudinally from each other to provide a gap therein around the center of the cross which the two track elements define.

A supplemental guide element is mounted for switching movement within this gap area between two limit positions wherein it fills the gap in one or the other of the two-part track elements, depending upon which of the two branch conveyors is to receive a diverted carton. In other words, if a carton traveling on the main conveyor is to be diverted to a branch conveyor on the left, the appropriate number of pusher elements will be caused to begin diverting movement to the left for that carton, and at the same time, the supplemental guide element will be moved to the position wherein it fills the gap in the left-diverting track element so that each of the appropriate number of pusher elements will be guided completely across the top apron run to effect side delivery of the carton.

The supplemental guide element can remain in its left position until it is needed for delivery to the right-hand one of that pair of branch outlets. Then when the latter occasion arises, the supplemental guide element will be moved to its other limit position in order to assure proper operation of the number of pusher elements required to effect delivery of the selected carton to the right branch conveyor.

In the conveyor of Case B, however, it is still necessary that each pusher element travel across the entire width of the main conveyor line to complete the delivery of a carton to a branch conveyor. The primary objective of the present invention is to reduce that travel requirement, and thereby to make it possible to accommodate branch conveyors both in directly opposed pairs along the main conveyor line and also in more closely spaced relation lengthwise of the conveyor line.

SUMMARY OF THE INVENTION

A conveyor in accordance with the present invention will include at least most of the major components of the conveyors disclosed in Case A and Case B, and the disclosures of both of those applications are accordingly incorporated herein by reference. In contrast with the conveyor disclosed in Case B, wherein each pusher element travels along one of the side edges of the main conveyor line until it is actuated to move across the line and to deliver a carton to a branch conveyor, each pusher element in the conveyor of the present invention carries out its carton-delivering movement in two stages, a primary stage which is carried out immediately after the pusher element enters the upstream end of the sortation section of the conveyor, and a secondary or final stage opposite the delivery station for the carton.

More specifically, each successive pusher element enters the upstream end of the sortation conveyor section on the side of the main conveyor line opposite the side to which it will deliver a carton, while each successive carton enters the sortation conveyor section in approximately the middle of the main line. As soon as each pusher element enters the sortation conveyor section, however, it is caused to travel to the middle of the apron, and in the course of that movement, it and its associated pusher elements preassigned to a particular carton will push their assigned carton to the opposite side of center of the apron.

Thus as each successive carton enters the sortation section, it will be moved to the right or left side of the apron from which it will subsequently be pushed off the apron, and the pusher elements which effect that pushing will remain in the middle of the apron until they approach the station to which they are to deliver the carton that is traveling beside them on the conveyor. At that point, these pusher elements will be actuated to complete their travel across the apron and thereby to push the carton onto the appropriate branch conveyor.

With this construction and mode of operation, the successive cartons are lined up near the upstream end of the beginning of the sortation section along the side of the apron from which they are to be pushed onto a branch conveyor. Similarly, the pusher elements assigned to each successive carton will travel to the proper delivery station on the middle of the apron, so that their delivery stroke will cover only one-half the width of the conveyor. As a result, the branch lines for receiving the cartons can be positioned correspondingly closer together, with relative spacings equal to less one-half the spacing required in the conveyor of Case B.

Details of the means by which the objectives and operating characteristics of the invention as summarized above are achieved will be more readily understood from the detailed description of the preferred embodiments of the invention which follows.

BRIEF DESCRIPTION OF THE DRAWINGS

FIG. 3 is a side elevation of one of the pusher elements incorporated in the conveyor of the invention;

FIG. 4 is a view looking upward from below the switching assembly which directs selected pusher elements to one or the other side of the upstream end of the sortation conveyor apron;

DESCRIPTION OF THE PREFERRED EMBODIMENTS

Figure 1:
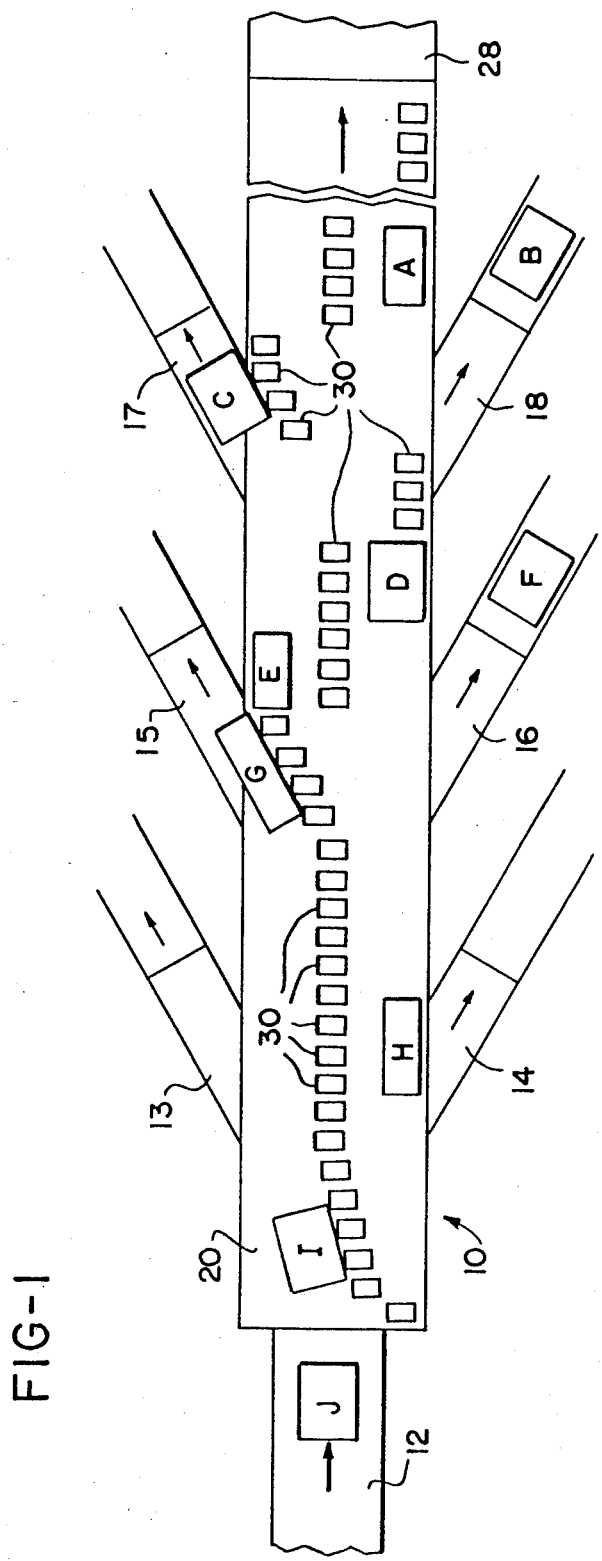
FIG. 1 is a schematic plan view illustrating the operation of a sortation conveyor in accordance with the present invention.

FIG. 1 shows a carton conveyor system including a sortation section 10 in a frame generally designated as 11 in other views. The sortation section 10 receives successive cartons from a supply conveyor 12 and sorts them to branch conveyors 13–14, 15–16 and 17–18, which are connected to frame 10 in directly opposed pairs. An endless apron 20 is supported for driven movement on the frame 11 to define a top conveying run moving from left to right in the drawing, and a bottom return run. The apron 20 is composed of a pair of roller chains 21 and multiple parallel cross tubes 22 carried by these chains, which are supported by idler sprockets 23 on a shaft 24 at the upstream end of the conveyor section and are driven by drive sprockets 25 on a shaft 26 driven by a motor 27 at the downstream end of the frame. It will be understood that any number of branch lines can be used as desired, as well as a further section 28 at the downstream end of section 10.

A pusher element 30 is mounted for sliding movement on each pair of cross tubes 22. As described hereinafter, these pusher elements are located along one side or the other of the apron 20 when they come up from the return run of the apron at the upstream end of the conveyor. The control system, which commonly includes a computer, will determine on which of the two sides of the apron each pusher element should be, in accordance with its desired diverting action during its movement with the apron beside the carton to which it has been assigned for that trip on the top apron run.

Each successive carton is deposited on the sortation section 10 in approximately the middle of the upstream end of the apron 20, and the pushers 30 which will divert it to a branch conveyor will come up on the opposite side of the apron from the branch conveyor to which that carton is to be delivered. As each of these pusher elements begins its travel with the apron, however, it is diverted from its initial position adjacent the edge of the apron to the middle of the apron, and during that movement, it and its associated pushers will move their assigned carton to the corresponding side of center of the apron. Then when that carton approaches the branch conveyor to which it is to be delivered, those pushers are again actuated to complete their movement across the apron and thereby to push the carton onto the appropriate branch conveyor.

Thus in FIG. 1, carton A is intended for delivery to a station downstream from the pair of branch conveyors 17–18 on the right side of the main conveyor. The carton B, which had preceded carton A on the main line, was diverted to branch conveyor 18, and the carton C which directly followed carton A on the main conveyor is in the process of being diverted onto branch conveyor 17.

The pushers 30 aligned laterally with carton D in FIG. 1 are on the left side of the apron and have pushed carton D to the right of the apron so that it may be diverted to branch line 18 or continue past it, to a further right-hand branch conveyor, while carton E may similarly be diverted to branch line 17 or travel past it. Package F, which had been between cartons D and E on the main line, has been diverted to branch line 16, and carton G is in the process of being diverted onto branch line 15.

The pusher elements aligned with carton H have pushed it to the right side of the apron, and that carton may therefore be delivered to either of branch lines 16 and 18 or may travel therepast. Similarly carton I is in the process of being pushed to the left side of the apron, and the pushers for carton J, which is still on supply conveyor 12 and will be deposited on the middle of apron 20, have not yet come up to the top run of the apron.

One of the pusher elements 30 is shown in FIG. 3 as of the same construction disclosed in Case A. Each includes a guide pin 33 that depends therefrom and carries an anti-friction bearing 35 which engages the appropriate guide track or tracks during operating movement of the pusher element. After a pusher has completed its operating movement, the guide pin 33 thereon is normally retained along the side of the apron by means of one of a pair of guide channels 40 and 42 which extend along the opposite sides of the frame.

As already noted, when each successive pusher 30 enters the upstream end of the upper apron run, it has already been positioned on the proper side of the apron opposite the side to which it will push the carton laterally aligned therewith on the apron. More specifically, and as described hereinafter, during their travel on the return run of the apron, all of the pusher elements are directed to the same side of the apron directly below the right-hand side of the top run, namely along the bottom of the view in FIG. 5, with their respective guide bearings 35 retained in an inverted guide channel 44.

This guide channel 44 delivers successive pushers to an inverted switch assembly 45 which may be constructed identically with the disclosure of Case A, and for convenience of reference, this inverted switch assembly is shown in FIG. 4. It is carried on a mounting plate 46 secured on the frame between the top and bottom runs of the apron 20, and the primary switch member is a channeled pin guide 50 which is bolted to a plate 51 mounted for pivotal movement on the plate 46 about the axis 52.

A double-acting fluid pressure cylinder 55 controlled by a solenoid valve 56 operates to move the switch member 50 between a retracted position, wherein it is aligned with the guide channel 44, and an advanced position at an angle to the guide 44, wherein it diverts successive pusher element guide pins 33 along a correspondingly angularly aligned path with respect to the guide 44. During the initial stage of this diverted movement, each guide pin 33 will travel first along the inside face of a blade 60 and thence along the inside face of a generally triangular guide plate 62 rigidly mounted on mounting plate 46. A second fixed guide plate 65 is bolted on the bottom of guide plate 62, and it has a guiding edge 66 set back from the guiding edge of guide plate 62 for engagement with the bearing 35 on each diverted guide pin.

The inside face of the guide plate 65 is aligned with the face of an inverted camming guide angle 70 which will direct the bearing 35 on each diverted pusher to the opposite side of the frame and into a funnel section defined by the end of the guide 70 and a second guide angle 71. This funnel section guides each bearing 35 into the pulley 72 on the idler shaft 24 which also carries the idler sprockets 23 for the chains 21.

Figure 2:
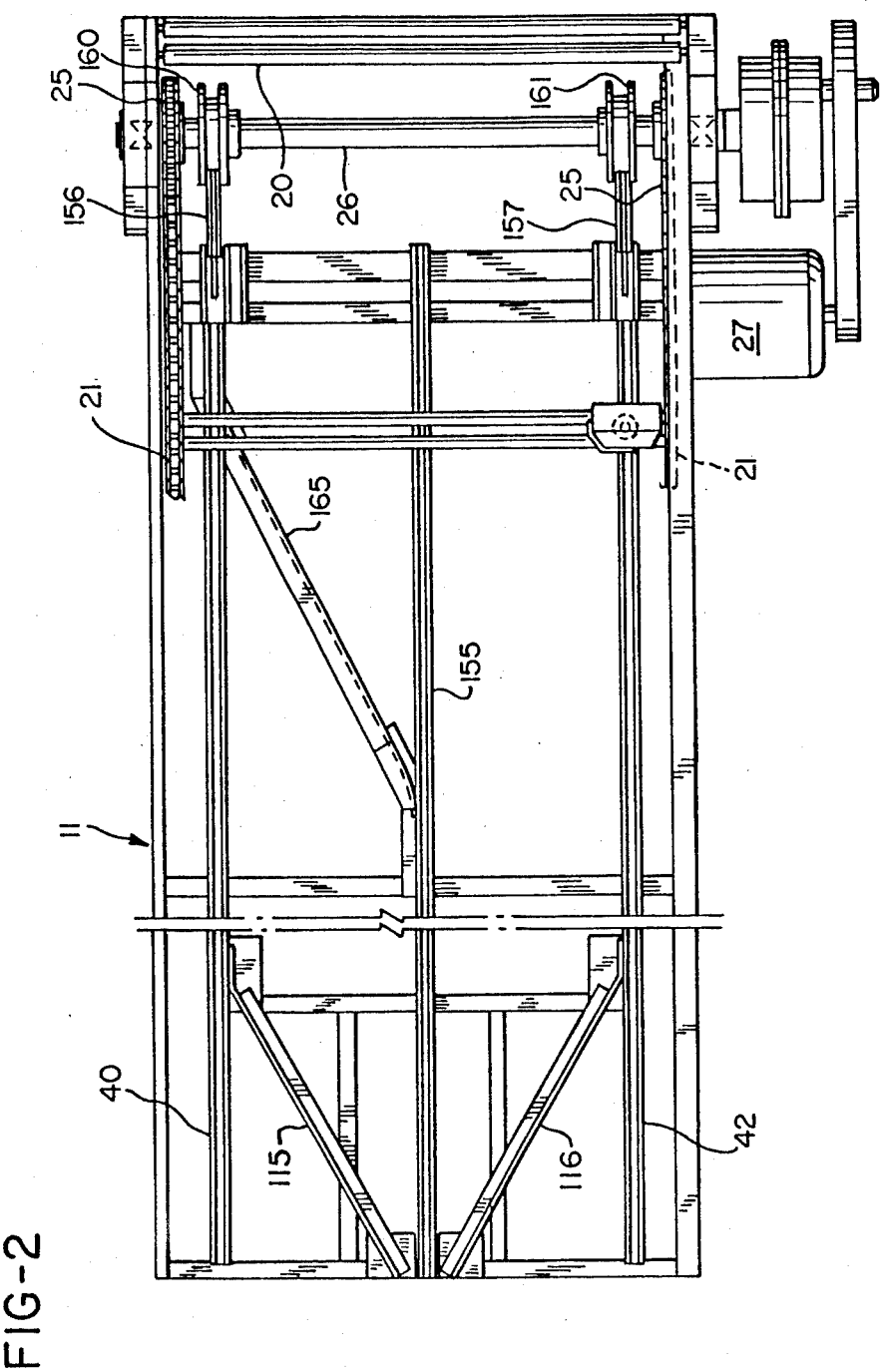
FIG. 2 is a partial plan view of the drive end of the conveyor of FIG. 1.

When the switch member 50 is in its retracted position, the successive pusher elements travel straight through it and along an inverted guide angle 75 which combines with a guide angle 76 at its left-hand end as viewed in FIG. 2 to define a funnel for directing successive bearings 35 into the guide pulley 77 on idler shaft 24. Thus the switch assembly 45 operates to direct successive groups of pushers to the proper side of the conveyor opposite the side to which they are to deliver the carton to which they have been assigned.

Figure 5:
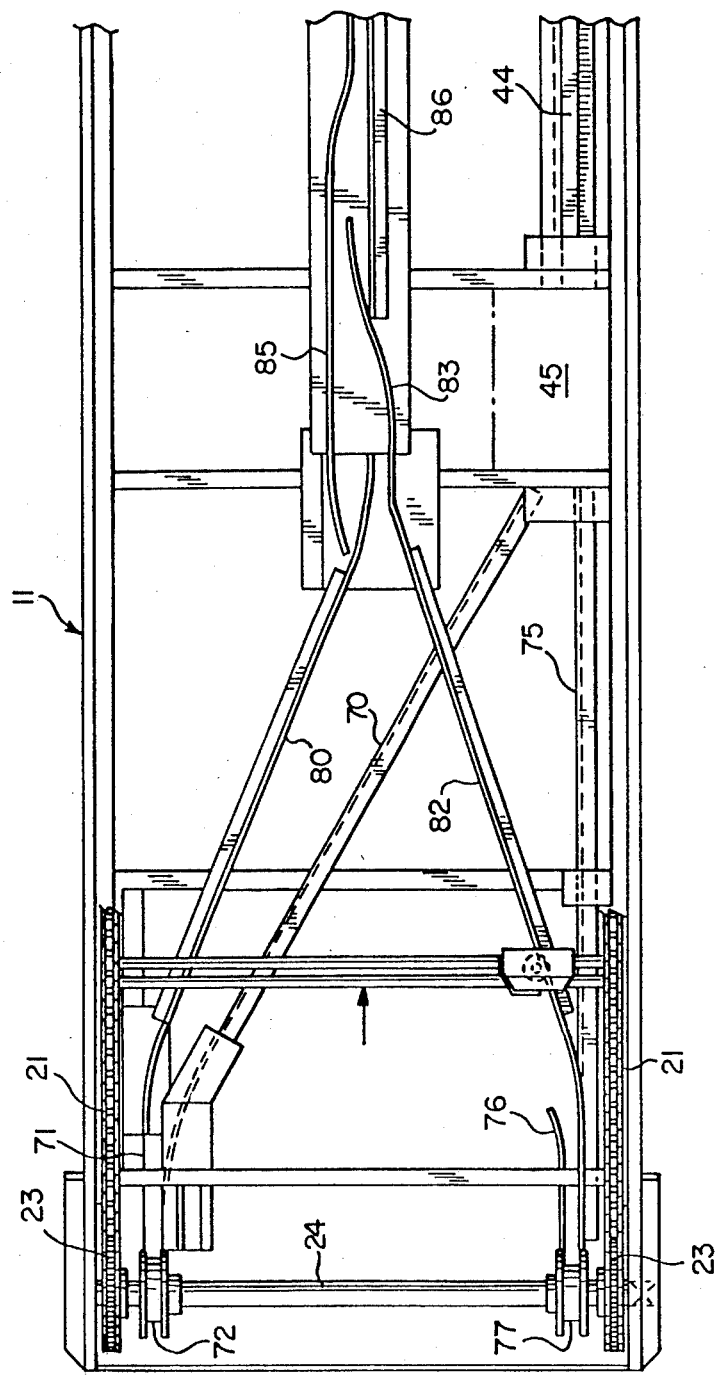
FIG. 5 is a partial plan view of the upstream end of the sortation conveyor of the invention.

In operation as illustrated in FIGS. 1 and 5, as carton A was first delivered to the upstream end of sortation section 10, the pushers assigned thereto had already been directed to the pulley 72 at the left side of the frame, and as each of those pushers entered the top run of the apron, its associated bearing 35 engaged the curved lead-in end of a guide angle 80 extending at an angle to just beyond the center line of the frame. A similar guide angle 82 extends from the right side of the frame, and this guide includes at its downstream end a curved end portion 83 which extends beyond the center line of the frame. Another curved guide angle 85 is positioned on the left side of center of the frame, and it forms a pair of funnel sections, first with the curved portion 83 of guide angle 82 and then with a straight guide angle 86 that cooperates with the straight downstream end of angle 85 to lead into a channel 88 through which each successive bearing 35 is guided downstream to the first of the successive switch assemblies 90 which define delivery stations where pushers may be diverted toward a branch conveyor line.

It will now be apparent that this series of cooperative guide means causes each successive pusher to move beyond the center line of the apron 20 as soon as it enters the upstream end of the upper apron run, and then to return to the apron center line. Preferably this movement should be sufficient to assure enough space between each pusher and its associated carton to assure freedom of movement of the pusher through one or more of the switch assemblies 90. Adequate such movement for this purpose has been found to be of the order of two inches, and in this process, each successive carton is therefore also pushed beyond the center line of the apron.

All cartons and pushers continue beyond this point in the same relative positions until a carton and the first of its associated pushers reach the station at which the carton is to be delivered to a branch conveyor. During this preliminary travel, all pushers will remain centered on the apron and spaced laterally from their associated carton, by the two-inch dimension noted above, so that the successive pushers are free of any restriction caused by contact with a carton as they travel through successive delivery stations.

Figure 6:
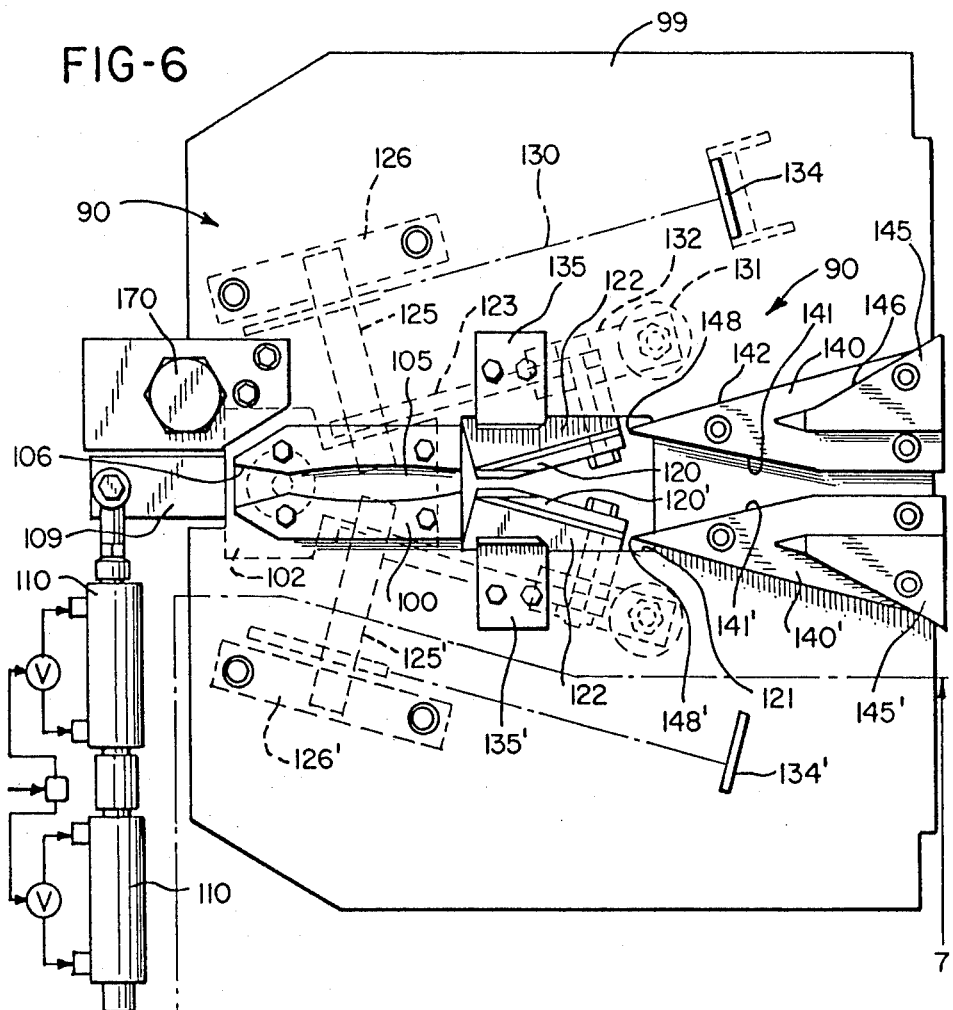
FIG. 6 is a fragmentary plan view showing the switching assembly which is located at each pair of branch lines along the conveyor of the invention.
Figure 8:
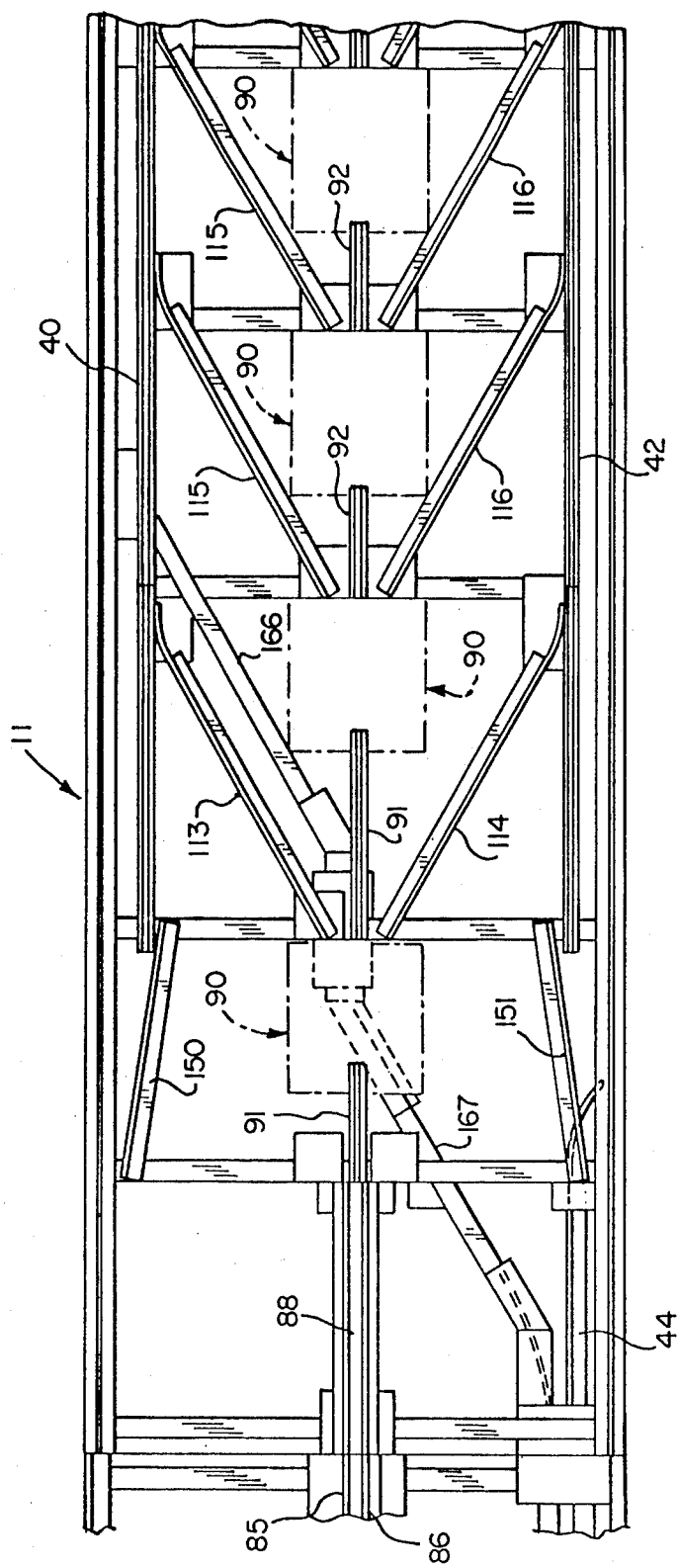
FIG. 8 is a plan view of a portion of the conveyor directly downstream from the portion shown in FIG. 5.

The first of these stations is shown in FIG. 8, wherein the guide 88 directs consecutive pushers into a three-way switch assembly 90 which can be actuated to cause a carton to be delivered to either of the branch lines 13-14 or to continue its travel to a subsequent such switch assembly 90, one of which is shown in detail in FIG. 6.

The switch assembly 90 is positioned between a pair of pin guide channels 91 and 92 extending along the middle of the frame, the guide channel 91 being in effect a continuation of the guide channel 88. The mounting plate 99 for the switch assembly 90 underlies the space between the pin guides 91 and 92, and the main element of this switch assembly is the pivotally mounted pin guide 100, which is mounted on the upper end of a pivot shaft 101 journalled in a bearing assembly which is mounted in a block 102 secured to the underside of plate 99.

The switch element 100 has a channel 105 therethrough for receiving the guide pins 33 on successive pusher elements 30, and this channel has a widened mouth 106 to receive pins 33 which may be slightly off the center line of the frame 10. It is in order to assure that each pusher be free to move as required for its pin 33 to enter the channel 105 that the pushers first move past center and then back out of contact with their associated cartons at the upstream end of the conveyor as already described.

Figure 7:
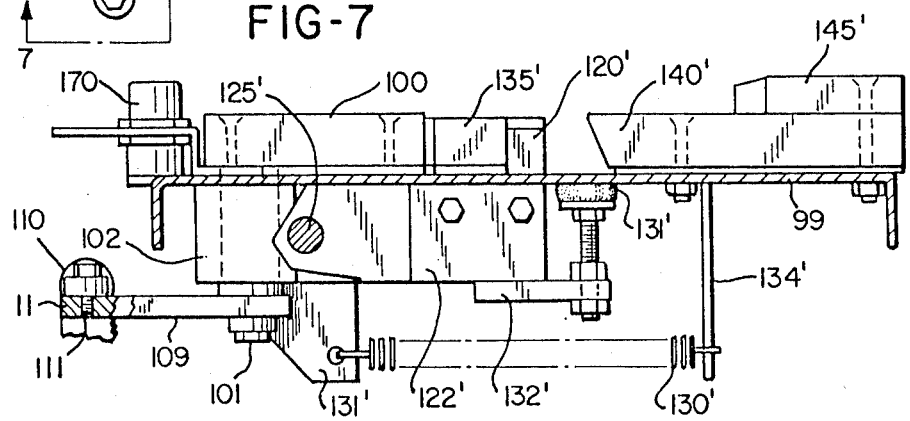
FIG. 7 is a side view taken as indicated by the line 7—7 of FIG. 6.

Provision is made for shifting switch element 100 selectively between a centered position forming a direct connection between the pin guides 91 and 92, and left and right diverting positions. As shown in FIGS. 6–7, a lever arm 109 is mounted at one end on the lower end of pivot shaft 101, and its other end is pivotally connected to the piston rod of one of a pair of fluid pressure cylinders 110, the piston arm of the other of these cylinders being secured to the frame as indicated at 111.

The cylinders 110 are controlled selectively by a pair of solenoid valves 112, and the arrangement is such that when one of the cylinders 110 is actuated, the switch element 110 will be held in its centered position. Similarly when both cylinders are actuated, the switch element 100 will be swung to its right-hand position, and when neither cylinder is actuated, the switch element 100 will be swung to its left-hand position.

In that left-hand position, the switch element 100 will divert successive pusher elements into guided relation with a cam guide angle 113 leading to the branch line 13. Similarly in its right-hand position, the element 100 will divert successive pusher elements into guided relation with a cam guide angle 114 leading to the branch line 14.

In its center position, as already noted, the element 100 will serve simply as a connection between the guide 92 which leads to the next switch assembly 90 and its associated angularly arranged guide tracks 115–116, and so forth. Each of these angularly arranged guide tracks leads to one or the other of the guide channels 40 and 42 which retain the pusher elements along one or the other edge of the apron until they reach the downstream end of the sortation conveyor 10 for further disposition as described hereinafter.

In order to prevent the possibility of having a pusher 30 jam at the upstream end of the guide angle 113, a knife-edged blade 120 is mounted below the plate 99 but extends through an opening 121 in plate 99 to a position wherein it lies between the path of each guide pin 33 along the center of the apron 20 and the path which each such pin will follow when the switching element 100 is in its left-hand position. The mounting for this blade 120 provides for its downward swinging movement in the event that it should be struck by the pin 33 on a pusher 30.

More specifically, the blade 121 is mounted on the side of a block 122 connnected by an arm 123 with one end of a rock shaft 125 having its other end supported in a bearing assembly 126 secured to the underside of plate 99. The shaft 125 is biased by a spring 130 to raise blade 120 to its raised position established by engagement against the underside of plate 99 of a bumper 131 carried by a bracket 132 projecting from the block 122. The spring 130 is connected between an arm 133 on the shaft 125 and a bracket 134 depending from the underside of plate 99.

An angle bracket 135 mounted on top of the plate 99 cooperates with the outer side of the blade 120 to define a converging channel 136 aligned with the channel 105 in the switching element 100 when the latter is in its left-hand position. There is a similar set of parts on the right-hand side of the switch assembly 90, which are designated by the reference characters 120', 122' and so forth.

Referring again to FIG. 6, when the switching element 100 is in its center or neutral position, the guide pin 33 on each successive pusher element will pass from the channel 105 to the space between the blades 120 and 120' to the space between a pair of triangular guide plates 140 and 140' and then between the opposed sides 141 and 141' of those two plates into the guide channel 92 leading to the next switch assembly 90.

If the switching element 100 is in its left-hand position, each successive pin will pass therefrom into the channel 136 between the blade 120 and the bracket 135 to the outer side edge 142 of the plate 140, which will cam it further to the left. A smaller triangular guide plate 145 is mounted on top of the guide plate 140, and its outer edge 146 will be engaged by the bearing 35 on each successive pusher element, the downstream end of this edge 146 being aligned with the outer side of the guide angle 113 so that each bearing 35 will continue to travel along angle 113 to the branch line 13.

If it should happen that any guide pin 33 should strike the plate 120 with its axis in direct line with its knife edge, the mounting for plate 120 will pivot to move the plate downwardly and thus out of the path of the guide pin, which will therefore continue its downstream movement until it engages one or the other of the side edges 141–142 of plate 140. If that pusher was intended to move to the left, and its pin 33 deflected to the right and thus against the guiding edge 142, the pusher will not take part in the action of delivering the carton assigned thereto, but the important fact is that this pusher will continue to move downstream with the apron, so that the possibility of any pusher being hung up in the switch assembly is eliminated.

Note also that the parts of the switch assembly 90 as a whole are so proportioned that the point 148–148' on the upwstream end of each of guide plates 140 and 140' is less than two inches from the center line of the conveyor. Therefore each pusher 30 is free of contact with a carton until its guide pin 33 has moved past these points and is being guided by one of the side edges of the plate 140 or 140'.

Special provision is also made for controlling any pusher element which may not be captured by one or the other of the guide angles 80 and 82. Referring to FIG. 8, there is a short guide angle 150–151 on each side of the first switch assembly 90, and each of these guide angles extends from the outer edge of the frame inwardly to a position just downstream from the upper end of the adjacent guide channel 40 or 42. Any pusher element which reaches this part of the conveyor without being captured in the guide channel 88 will thereby be prevented by one of the guides 150–151 from impinging on the end of a guide channel 40 or 42, and it will travel to the angle 113 or 114 which will in turn guide it into the channel 40 or 42.

Thus when each pusher reaches the downstream end of the sortation conveyor as shown in FIG. 2, it should have its guide pin 33 retained in one of the channels 40 and 42, or else in a centrally located similar guide channel 155. The pushers which are in guides 40 and 42 are guided from their downstream ends by short lengths of pin guide channels 156–157 to pulleys 160–161 on the chain drive shaft 26. The guide 155, however, terminates upstream from the pulleys 160–161, so that any pushers guided therein simply follow around the pulleys to the return run of the apron.

An inverted guide angle 165 extends below the left-hand half of the driving end of the conveyor in position to intercept the bearings on all pusher elements on that side of the conveyor and guide them to the center of the return run of the apron. No means are needed for otherwise guiding these pusher elements until they approach the upstream end of the conveyor, where there is a similarly arranged inverted guide angle 166 (FIG. 8) which directs any pusher elements below the left-hand side of the conveyor to the middle. A second inverted guide angle 167 extends from below the middle of the conveyor to the inverted guide channel 44 below the right-hand side of the conveyor and will which guide successive pusher elements into the switch assembly 45 as previously described, so that all pusher elements will reach this switch assembly.

It will accordingly be seen that the present invention provides a sortation conveyor having all of the advantages of the conveyor shown in Case B plus the ability to sort packages to branch conveyors which are not only directly opposite each other but also more closely spaced along the sides of the main conveyor. More specifically, since each successive carton is moved past the center line of the main conveyor section as soon as it enters the upstream end thereof, each carton will have to move less than one-half the width of the apron as it is being delivered to a branch line, so that the branch lines are correspondingly close together. For example, in a conveyor section according to the invention wherein the frame has an overall width of 54 inches, the successive delivery stations can be spaced so closely that the center lines of the branch conveyors on the same side of the frame can be spaced by as little as 27 inches, as compared with 99 inches for the sortation conveyor of Case B.

The sortation conveyor of the invention may be used with any of a number of conventional control systems, preferably of the computerized type, and particularly with such a control system wherein each carton is provided with indicia to be read by an appropriate scanner which designates to the computer the branch conveyor to which that carton is to be delivered. The computer will then operate switch assembly 45 to direct the pushers for that carton to the proper side of the top run of the apron, and thereafter will operate the proper switch assembly 90 to effect delivery of the carton. The control system may include a proximity switch 170 at each switch assembly 90 which will trigger actuation of cylinder 110 as the appropriate pusher approaches the associated switch element 100.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A sortation conveyor system for cartons and the like including a frame defining a main line and a plurality of branch lines leading from opposite sides of said main line, comprising:
   (a) an endless apron supported for movement on said frame to define a top conveying run and a bottom return run,
   (b) means for driving said apron,
   (c) a plurality of pusher elements mounted for sliding movement on said apron from one side thereof to the other to push a carton laterally aligned therewith to said other side,
   (d) means for causing said pusher elements to enter the upstream end of said top run of said apron in preselected groups with each such group on the opposite side of said apron from the branch line to which the carton laterally aligned therewith is to be delivered,
   (e) guide means adjacent each side of the upstream end of said frame positioned to direct each such group of pusher elements to the center of said apron and thereby to cause said pusher elements to move said aligned carton to the opposite side of center of said apron,
   (f) selectively operable switch means associated with and mounted centrally of said frame upstream from each said branch line for movement between a centered guiding position and a guiding position aligned with said associated branch line wherein said switching means diverts successive said pusher elements toward said branch line, and
   (g) means defining a guide track extending from said switch means to each of said branch lines associated therewith for guiding said diverted pusher elements across the remainder of said apron to said associated branch line.

2. A conveyor system as defined in claim 1 wherein said branch lines are arranged in substantially opposed pairs, and wherein said guide tracks are arranged in pairs with each said pair leading from an associated said switch means to the associated said pair of branch lines.

3. A conveyor system as defined in claim 1 wherein said guide means (f) includes means for causing each said pusher element to move a predetermined distance beyond the center line of said apron and then to return to said center line and thereby to establish space between each said centered pusher element and said carton aligned therewith upstream from the first said switch means.

4. A conveyor system as defined in claim 3 wherein the upstream end of each said guide track is spaced from the center line of said frame by less than said predetermined distance, whereby each said diverted pusher element will move into guided engagement with said guide track prior to contact thereof with the carton laterally aligned therewith on said apron.

5. A conveyor system as defined in claim 1 wherein said branch lines are arranged in substantially opposed pairs, said guide tracks are arranged in pairs with each said pair leading from an associated said switch means to the associated said pair of branch lines, and said guide means (f) includes means for causing each said pusher element to move a predetermined distance beyond the center line of said apron and then to return to said center line and thereby to establish space between each said centered pusher element and said carton aligned therewith upstream from the first said switch means.

6. A conveyor system as defined in claim 5 wherein the upstream ends of each said pair of guide track are spaced from the center line of said frame by less than said predetermined distance, whereby each said pusher element diverted toward one of said guide tracks will move into guided engagement with said track prior to contact thereof with the carton laterally aligned therewith on said apron.

* * * * *